Figure 3:
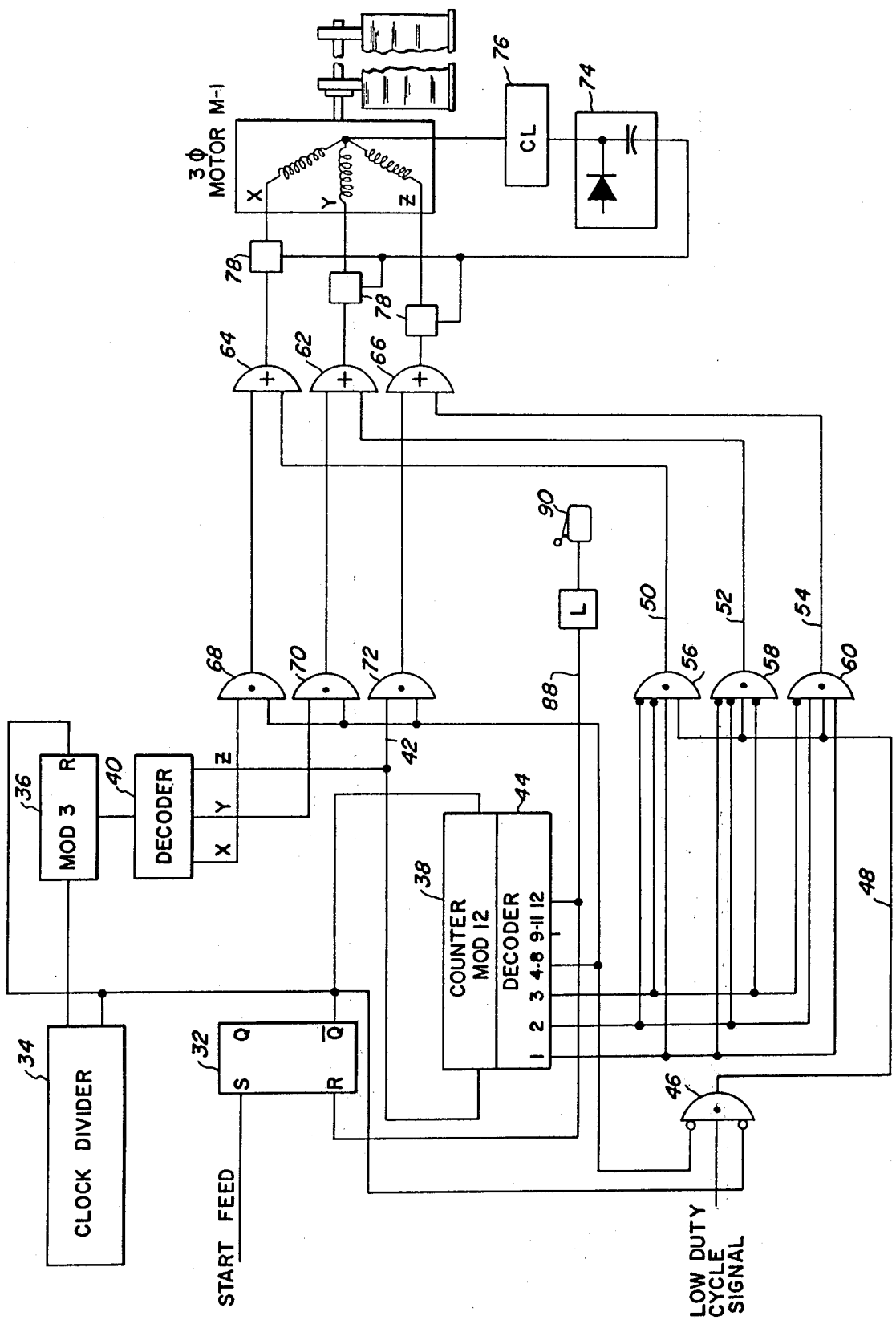

United States Patent [19]
Reehil et al.

[11] 3,991,355
[45] Nov. 9, 1976

[54] STEPPER MOTOR CONTROL

[75] Inventors: Edward G. Reehil, Henrietta; Edward L. Steiner, Macedon, both of N.Y.

[73] Assignee: Xerox Corporation, Stamford, Conn.

[22] Filed: Dec. 27, 1974

[21] Appl. No.: 537,026

Related U.S. Application Data

[62] Division of Ser. No. 444,998, Feb. 22, 1974, Pat. No. 3,909,125.

[52] U.S. Cl. ............................................... 318/696
[51] Int. Cl.² ......................................... H02K 37/00
[58] Field of Search ............ 318/138, 162, 254, 685, 318/696

[56] References Cited
UNITED STATES PATENTS

| | | |
|---|---|---|
| 3,304,480 | 2/1967 | Ko ...................................... 318/696 |
| 3,374,410 | 3/1968 | Cronquist et al. ............... 318/254 X |
| 3,423,658 | 1/1969 | Barrus .................................... 318/696 |
| 3,865,030 | 2/1975 | Chida et al. ..................... 318/696 X |

*Primary Examiner*—Gene Z. Rubinson

[57] ABSTRACT

A feed control apparatus employing a control circuit for accurately positioning the shaft of a multiphase stepper motor by selective energization of respective phases of the motor under the influence of a low duty cycle power supply and a one way clutching mechanism thereby accurately positioning the motor in a proper angular position such that normal energization of the motor phase coils will result in the desired motor drive direction.

6 Claims, 5 Drawing Figures

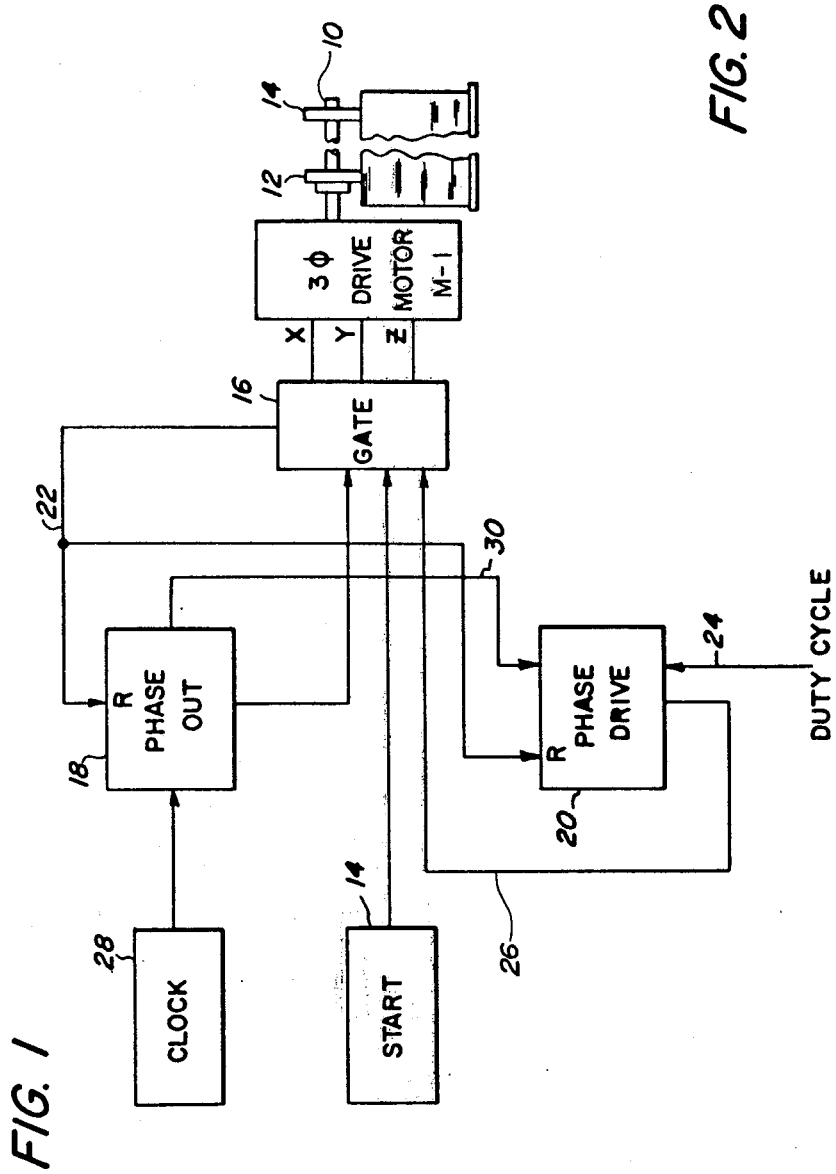

STEPPER MOTOR CONTROL

This is a division, of application Ser. No. 444,998, filed Feb. 22, 1974, now U.S. Pat. No. 3,909,125, issued Sept. 30, 1975.

DESCRIPTION OF INVENTION

This invention relates to feed control, and more specifically feed control utilizing a stepper motor.

There are many applications and environments requiring precise control for a motor drive. One area is the control of sheets or similar type documents from a stack, such as the feeding of punched cards from a stack into a computer. A further utilization in the feeding of copy sheets from a stack into the feed path of a copier or duplicator, used for reproduction purposes One example of such a processor is disclosed in U.S. Pat. No. 3,790,270 assigned to the assignee of the present invention.

In situations where accurate feed movement is important in maintaining the integrity of a system, it has become necessary to insure that suitable driving schemes may be employed which will admit of such accurate positioning. One common form of motor drive employs multi-phase stepper motors which, as is well known, may be accurately positioned by selective energization of the respective phases. It is known, for example, that the energizing of one phase of a three phase stepper motor will increment the motor shaft through a precise angular displacement. Thus, by selective energization of the sequential phases of the system, an extremely accurate path travel may be controlled.

The utilization of stepper motors, however, gives rise to certain difficulties. If the phase energized does not correspond to the motor position at any given moment, the direction may not be in the direction desired. For example, if a stepper motor includes X, Y and Z phases, and is currently positioned on its Y phase, the application of an X phase pulse will cause the motor to actually move backwards one phase to reposition itself. Where accurate travel in a feed mechanism is essential, but where the initial position of the motor shaft is not predictable, it becomes necessary to insure the motor is accurately positioned at a specific phase prior to energization in order to insure that the correct driving distance will in fact be realized.

Conventionally, the stepper motor may be locked in one known phase by applying power continuously to that one phase during period of non use. However, this has the effect of increasing power consumption and decreasing motor life. Additionally, the continuous power application can cause temperature rise problems as well as increasing the requirements placed on solid state power supply systems. It is thus desirable to be able to turn off all power to the motor during intervals of non use, and be able to precisely drive the motor shaft through a predetermined angular displacement for each intermittent application of power.

It is therefore the primary object of the present invention to provide a control system for accurately positioning a stepper motor prior to energization to insure that accurate driving may be maintained.

It is a secondary object of the present invention to provide a control system for a stepper motor which will insure that the motor will always move in the forward direction upon energization.

It is a still further object of the present invention to provide a control system which will enable the accurate positioning of a stepper motor in an environment wherein the last position of the stepper motor is not controlled by the system driving the motor.

The foregoing objects of the present invention are realized in an apparatus wherein the stepper motor is automatically repositioned at the beginning of each drive cycle by a predetermined drive pattern. More particularly, the apparatus involves positioning the motor by employing a low duty cycle drive and a uni-directional coupling to the load. The uni-directional coupling has the effect of inhibiting forward but not reverse rotation of the motor when energized by the low duty cycle drive signal. Thus, initial phasing may be applied to the motor for re-establishing the motor to a predetermined phase location prior to sequential energization for the desired drive sequence. The invention thus provides a reverse energization pattern of first, second and third phase positions, causing the motor to move in either its reverse direction or attempt to move in a forward direction, for establishing the motor in a specific third phase. Once in that third phase, the normal forward drive signal at full duty cycle may be applied sequentially through each of the three phases for driving the motor in the proper direction through a predetermined angular rotation.

More specifically, a predetermined positioning drive pattern is established by a first decoding mechanism in response to a clock pulsing system activated by a start control. The initial decoded pattern sets the drive motor on its proper phase for subsequent sequential drive by a second decoder, timed to provide the proper drive sequence. The second decoder provides the reset for the system and may also be employed to provide a test signal insuring that a feed control process has been properly carried out by the motor drive.

Figure 4:
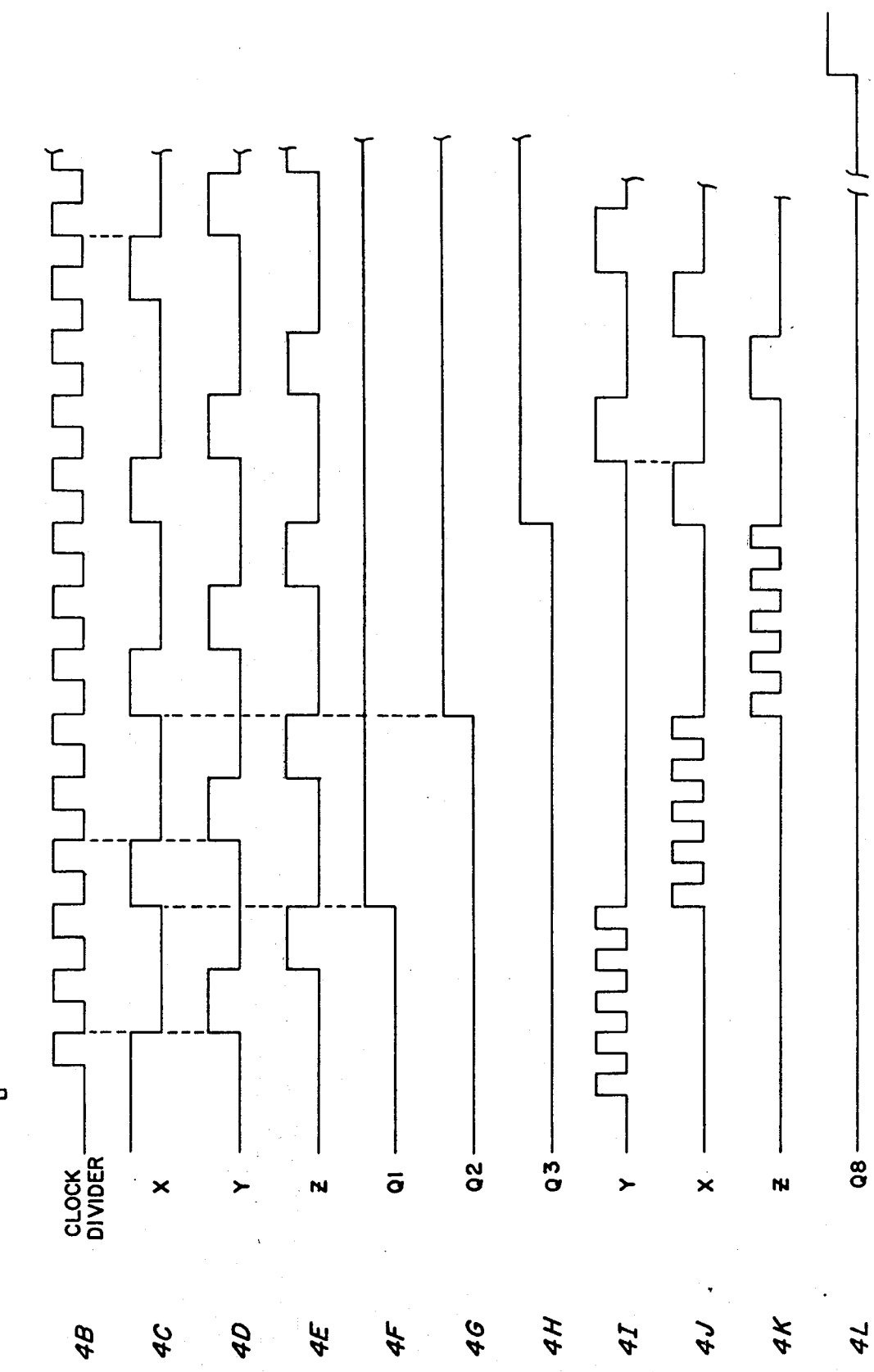
Figure 5:
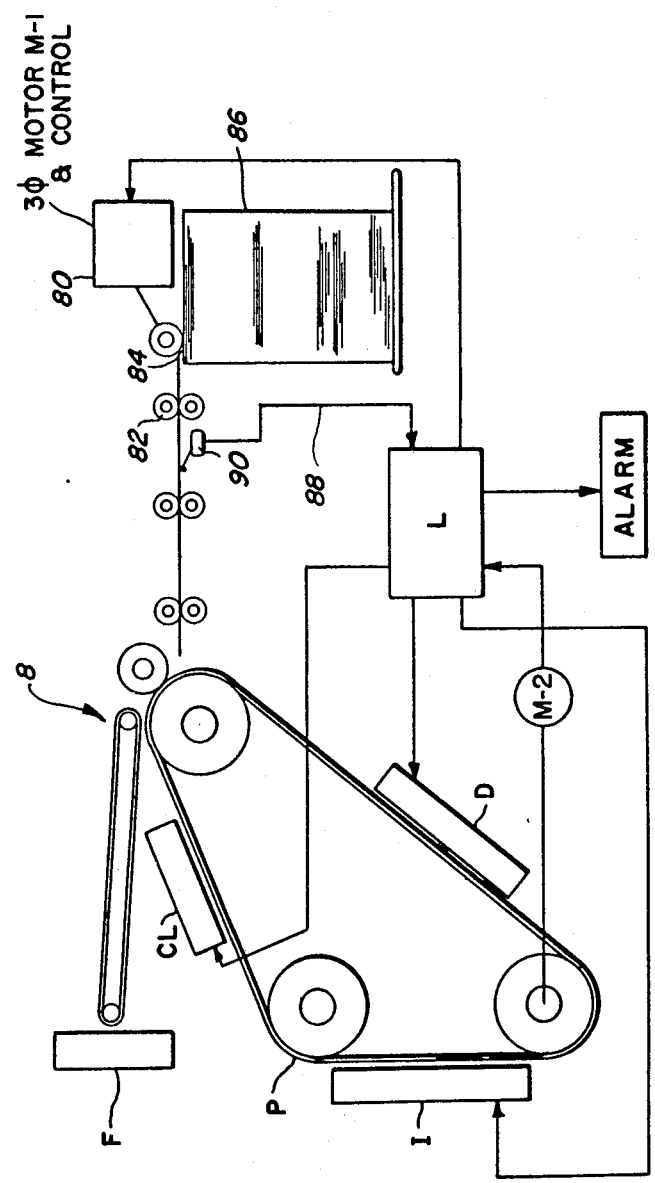

The foregoing objects and brief description of the present invention will become more apparent from the following more detailed description wherein FIG. 1 is a general block diagram of the operation and the present invention, FIG. 2 is an illustration of the positioning pattern operation, FIG. 3 shows a more detailed logic diagram illustrating the control arrangement of the present invention, FIG. 4 is a timing diagram illustrating the operation of FIG. 2, and FIG. 5 illustrates use of the invention in connection with an electrostatographic reproducing apparatus.

In a three phase stepper motor employing sequential phases X, Y and Z, it is known that the motor will run in its forward direction by sequentially pulsing the phase lines X, Y and Z over a desired time interval. In a situation where the three phase drive motor starts from an unknown phase, it is desirable to insure that the motor be positioned at its Z phase such that a sequential application along the X, Y and Z lines, beginning at the X line, will drive the motor continuously forward. In accordance with the present invention, the three phase motor is accurately positioned at the beginning of the drive cycle regardless of which phase the motor was last placed by applying a predetermined drive pattern to the motor along its respective phase input lines in such a manner as to select and position a specific phase of the motor prior to the main drive energization. Of course any sequence of phases may be employed and any specific phase may be a start phase.

It is only necessary that the start phase be pre-determined so that the drive sequence will be predictable.

For purposes of illustration, the motor drive system of the present invention is shown in conjunction with a document feeding apparatus, the motor being thus employed to feed documents seriatim from a stack of such documents for use in a document processing machine. Such document processing is conventionally accomplished in copier/duplicator machinery, or with computer equipment, as in the feeding of punched cards or the like.

In such environments, the motor is employed undirectionally, with a motor driven friction means engaged with documents to be fed for driving the documents forward by the desired distance. To this end, and with reference to FIG. 1, the output shaft 10 of the three phase stepper motor M-1 is provided with a friction driving roller 12 coupled to the shaft 10 by means of a unidirectional loading device 14 which may take the form of a one way clutch. The one way clutch establishes a free running condition for the shaft in the reverse mode of the motor such that the motor will freely rotate in the reverse direction without rotating the sheet driving apparatus roller mechanism. It will, of course, be understood that the sheet driving roller apparatus 12 may include any other form of driving mechanism utilizable in accordance with the control system for establishing an accurate forward drive for the motor. For example, a dual set of friction rollers having entrained drive bands, or other suitable drives may be employed.

To establish the initial positioning pattern, it is necessary to utilize a free running reverse and a full load condition forward. Thus, for the positioning pattern, a low duty cycle signal for applying power is provided to the motor. The low duty cycle will be sufficient to cause the motor to rotate freely in its reverse direction but will, however, be insufficient to drive the motor against the load in its forward direction. The duty cycle in this arrangement will thus cause the motor to stall when attempted to be driven in a forward direction and will therefore cause the motor to hold in position for the duration of the forward duty cycle pulse.

With these conditions in mind, reference is made to FIG. 2 in which the manner of positioning the phases of the drive motor is illustrated. The predetermined sequence applied to the drive motor for positioning involves applying a first low duty cycle pulse to the Y phase, a second low duty cycle pulse to the X phase and third low duty cycle pulse to the Z phase. By utilizing this sequence, and by establishing the motor direction control conditions as described above, the application of the third pulse in the three-pulse sequence described above will position the motor in its Z phase regardless of the condition of position of the motor when the initial signal is applied. Referring to FIG. 2, this point is illustrated in tabular form. As shown in FIG. 2, the first pulse application is along the Y phase line, shown in column 1. In column 2 are the three possible positions of the motor M-1. If the motor M-1 is originally positioned in its X phase, application of the Y phase low duty cycle signal will result in no motor movement since the forward directon of the motor will stall. If the motor was initially in its Y phase, application of the low duty cycle Y phase signal will result in no movement leaving the motor in its Y phase condition. If the motor is in its Z phase, the motor will reverse and move backward by one phase in accordance with the operation of the free running reverse clutch mechanism, thereby leaving the motor in its Y phase.

The next phase to be energized is the X phase. There are now only two possible phase position conditions for the motor, either X or Y. If the motor is in its X phase, application of the X phase signal will leave the motor in its X phase condition. If the motor is in its Y phase, application of the X phase condition will cause the motor to free run backward by one phase leaving it in its X phase condition.

Finally, the Z phase pulse is applied. At this point there is only one possible condition the motor can be in and that is its X phase. Since the motor is free running in its reverse direction, application of the Z phase will cause the motor to return to its Z phase condition.

Thus the sequential application of the Y and X phase, under the influence of a low duty cycle and a free running reverse mechanism, will result in the motor in each instance being positioned in its Z phase regardless of its initial position. The motor is now ready to be driven in its forward direction with the assurance that the application of the first X phase signal thereafter will cause the motor to move in its forward direction.

Referring to FIG. 1, the motor activation is initiated by a START signal 14 applied to the gating circuit 16, causing release of a reset condition to the phase control circuit 18 and phase drive circuit 20 along the reset line 22, applied to each of these respective controls.

The phase drive circuit 20 receives the low duty cycle positioning signal applied along line 24, and passes the signal to gate 16 along the line 26 in accordance with a timing signal from the clock source 28 derived through the phase control 18 along the line 30 as will be described in further detail below. The phase control circuit 18 accomplishes the repositioning through the phase drive circuit 20, by application of the pattern of signals to the Y, X and Z phases respectively, as described above, through the action of the gate 16. At the end of the pattern sequence, the gate 16, along line 22, disables the phase drive circuit 20 and enables the phase control circuit 18 for supplying a continuing sequential drive pulses along the X, Y and Z for driving the motor forward over the desired timed sequence.

Referring to FIG. 3, and the timing diagram of FIG. 4, the operation of the logic described in FIG. 1 is shown in greater detail. The start feed signal shown in FIG. 4A is applied to a latch or flip-flop 32 causing the complemented output Q of latch 32 to go to zero, the zero representing a low logic level. The logic zero signal is applied to the clock divider 34, producing the signals of FIG. 4b and to a modulo three counter 36 which in turn begins to generate a sequential series of X, Y and Z pulses from a decoder 40, shown in FIGS. 4c, 4d and 4e, respectively. The output signal derived from the Z stage of the decoder 40 is applied along a line 42 to the modulo 12 counter 38. The modulo 12 counter 38 will thus count one for each third pulse provided from the decoder 40. A decoder 44 is coupled to the modulo 12 counter 38 for providing the pulse sequence along respective output lines. The modulo 12 counter 38 is designed to trigger along the trailing edges of the Z pulses applied along line 42 as shown in FIG. 4F.

The initial time sequence, beginning with the start paper feed signal and continuing until the state three of the decoder 44 goes high, represents a timing period during which the gate 46 will be open to pass low duty cycle pulses along line 48. As shown in FIGS. 4I, 4J and 4K, a typical duty cycle pulse utilized in accordance with the present invention includes a 700 Hz signal having a twenty percent duty factor, (on 20 percent of the time and off 80 percent of the time) as illustrated. Utilization of the low duty cycle signal provides insufficient power in view of the forward load on the motor to drive motor M-1 forward but is sufficient to drive the motor in reverse direction. The application of the pulses along the lines 50, 52 and 54 thus sufficient to cause the motor to undergo the desired phase change in accordance with phase position as was described in conjunction with FIG. 2. The operation of the system as described above is to provide a low duty cycle through the gates 56, 58 and 60 in an order whereby the first duty cycle is applied along the output line 52 to the Y phase input of the motor, the next applied along the line 50 to the X phase input of the motor and the last from the line 54 to the Z phase input of the motor as was described in connection with FIG. 2. To this end, the first AND gate to be energized, 58, receives three low signals, FIGS. 4G, 4H, 4I passing the low duty cycle signal applied along the line 48 to the Y phase of the three phase drive motor through the OR gate 62. At the end of the first pulse application period, defined by the duration beginning with the leading edge of the first X pulse and terminating with the trailing edge of the last Z pulse, the output stage 1 of the decoder 44 goes high, thereby inhibiting gate 58 and enabling gate 56 for applying the next successive cycle signal along the line 48 through the line 50 and into the OR gate 64 for application to the X phase of the drive motor as shown in FIG. 4J.

At the termination of this time period, indicated by a rising signal from the stage 2 of the decoder 44, the gates 56 and 58 are both inhibited and gate 60 enabled applying the last of the successive series of pulses from the line 48 to the Z phase of the drive motor as is shown. Finally, when the decoder 44 stage 3 goes high, the gate 60 is inhibited, thereby inhibiting the line 54, and ceasing passage of the low duty cycle signals.

As shown in FIGS. 4f, g and h, the decoder 44 stages 1, 2 and 3 will remain high for a period of time determined by the length of forward drive portion of the cycle. By remaining high, the gates 56, 58 and 60 are clocked and the low duty cycle signal is inhibited from passage through the gates 62, 64 and 66 to the three phase drive motor. As the stage 3 of decoder 44 goes low, a high signal is commonly applied to the AND gates 68, 70 and 72 result in passing sequentially the X, Y and Z pulses emerging from the decoder 40 for driving the motor in its forward direction. These signals are also shown on axes 4I, 4J and 4K of FIG. 3. The motor may derive power from the power source 74, which may be an SCR driven capacitor storage source. The additional motor windings are energized by corresponding solid state switches 78 driven via the gates 68, 70 and 72 in accordance with their sequential opening by means of the pulses X, Y and Z supplied from the decoder 40. A constant current limiter 76 of conventional design can also be employed to minimize the current rise time in the step motor thereby increasing motor performance.

The operation is designed to continue for any desired period of time. By gating the output stages 4 through 8 of the decoder 44 together in a common line, the drive will continue until the counter 12 has emptied the last of the stages 4 through 8. Thus, when the stage 8 energizes the output line from the combined stages 4 through 8, the gates 68, 70 and 72 are disable thereby ending the forward feed pulses to the drive motor M-1 10.

Referring to FIG. 5 for utilization wherein the motor is being employed as a drive mechanism for feeding sheets from a stack, the sheets are presumably driven for a predetermined period of time by the three phase motor control 80 of the present invention until the sheets are picked up by means of a set of driven pickup rollers 82.

Presumably, the forward drive in the motor is sufficient to dislodge the top sheet 84 from the stack 86 to the point where it may be secured by the pickup rollers 82 and pulled therefrom and enter the system. By providing a further stage indicated as 12 on the decoder 44, the means for detecting the satisfactory completion of the pickup and discharge may be provided. This is accomplished by providing a misfeed test signal on the output line 88 which samples the condition of the switch 90 located at the opposite side of the feed roller 82. The misfeed test signal is derived from the decoder 44 length stage 12 to indicate a passage of time required for the paper to reach the switch 90, considering the drive speed of the rollers 82. If at the time of the signal, the switch 90 is not closed by the sheet, an appropriate alarm signal may be generated indicating to the operator that some failure in the feeding has occurred.

At the same time, the signal provided from the decoder stage 12 may be coupled to the reset of the flip-flop 32 causing flip flop 32 to apply a reset signal to each of the counters 36 and 38 and to clock generator 34, thereby inhibiting any further operation of the system.

The system shown in FIG. 5 includes a logic control L for energizing various functions of an exemplary copying machine 8 in accordance with timing signals, derived from the main drive motor M-2. The timing signal may be employed to drive the stepper motor M-1 of the present invention, by providing input pulses to the clock divider 34. The speed of the stepper motor M-2 is synchronized to the main drive motor M by use of the clock signal so that the stepper motor performs its function in synchronism with the operation of the machine driven by the motor M.

In addition, the logic control L can be employed to provide the start feed signal to the latch 32. As a specific utilization, shown in FIG. 5, the invention may be employed in conjunction with a copy sheet feed system in an electrostatographic reproduction device, such as is shown in U.S. Pat. No. 3,790,270. The control logic L is utilized to control the sequencing of the reproductive process, including the start feed signal applied to the three phase motor control, in conjunction with the energization of the motor M-2 to drive a photoreceptor element P. Element P is in the form of an elongated flexible photoreceptor belt driven past a plurality of operating stations. Obviously other image receptor elements may be used, such as a drum, a roll of photoreceptor material, and the like. Conventionally, the stations include imaging I, development D, transfer T, fusing F and cleaning C, all under the sequential control of the logic L. It is thus evident that the arrival of a copy sheet 84 from the stack 86 must coincide with the arrival of an image area as placed on the photoreceptor P. The precision of feeding is thus evident, and utilization of the present invention therefore forms an important contribution to the quality and speed of the reproductive process.

In addition, the use of the misfeed feature will also be of significant advantage in a reproductive system as described above, and forms an important part of the invention as well. The logic control L responds to the alarm condition from the misfeed with 90 to provide a suitable response, such as shutdown.

Obviously, other uses of the motor control of the present invention will be apparent. Further, while a preferred embodiment of the motor control has been illustrated, other modifications, variations and alternative embodiments will be evident to those skilled in the art.

What is claimed is:

1. A three-phase motor drive control, said motor having a loaded rotational direction and a non-loaded rotational direction, means for applying a first power signal insufficient to overcome said load, first gating means coupled to said three-phase motor for first gating said first power signal to a second motor phase, second gating said first power signal to a first motor phase, and third gating said first power signal to a third motor phase, said motor responding to each of said signals for positioning at said third phase location, and second gating means for sequentially gating a second power signal, sufficient to drive said motor against said load, to said first, second and third motor phases for driving said motor in said loaded rotational direction.

2. A motor control system for a multi-phase motor for positioning said motor on a predetermined phase at the beginning of a drive cycle, and driving said motor thereafter over a predetermined displacement, comprising first control means supplying a sequential series of phase enabling signals, a second control means providing a second series of control signals, said second control means applying said sequential series of phase enabling signals to said motor in a predetermined sequence in response to said second series of control signals; first power means for applying power to said motor, said motor being bi-directional and loaded in a first direction and free running in a reverse direction, said second control means including first gating means for applying said first power means to said motor in said predetermined sequence whereby a predetermined motor phase is positioned, second power means, and second gating means responsive to the end of said predetermined sequence for applying said second power means to said motor in a normal sequence causing said motor to run in said loaded direction.

3. The control system of claim 2 wherein said motor is a three phase motor and wherein said second gating means applies said second power means, sequentially to first, second and third motor phases respectively to drive said motor in said first direction, said predetermined phase being said third phase, said first gating means applying said first power means to said second motor phase first, said first motor phase second, and third motor phase last.

4. The control system of claim 2 wherein said first control means includes a counter and decoder, said counter counting in accordance with a predetermined pulse input rate, said decoder being coupled to said counter for supplying a plurality of output signals, one for each phase of said multi-phase motor.

5. The control system of claim 4 wherein said second control means includes a second counter and second decoder, said second counter being coupled to said first counter whereby to count in accordance with the counting rate of said first counter, said second decoder supplying output signals along a plurality of output lines, a first portion of said output lines being coupled to said first gating means for providing said predetermined sequence.

6. The control system of claim 2 wherein said motor includes a one-way clutch for loading said motor in said first direction while permitting said motor to run free in said reverse direction.

* * * * *